US012641606B2

(12) United States Patent
Wu et al.

(10) Patent No.: US 12,641,606 B2
(45) Date of Patent: May 26, 2026

(54) UPLINK TRANSMISSION METHOD, UPLINK TRANSMISSION INDICATION METHOD, AND DEVICE

(71) Applicant: VIVO MOBILE COMMUNICATION CO., LTD., Chang'an Dongguan (CN)

(72) Inventors: Yumin Wu, Chang'an Dongguan (CN); Zhi Lu, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 457 days.

(21) Appl. No.: 17/731,788

(22) Filed: Apr. 28, 2022

(65) Prior Publication Data

US 2022/0256581 A1     Aug. 11, 2022

Related U.S. Application Data

(63) Continuation of application No. PCT/CN2020/124614, filed on Oct. 29, 2020.

(30) Foreign Application Priority Data

Oct. 29, 2019    (CN) .......................... 201911039529.3

(51) Int. Cl.
*H04W 72/21*          (2023.01)
*H04L 1/1812*         (2023.01)
          (Continued)

(52) U.S. Cl.
CPC ........... *H04W 72/21* (2023.01); *H04L 1/1812* (2013.01); *H04W 72/23* (2023.01); *H04W 72/569* (2023.01); *H04W 74/0833* (2013.01)

(58) Field of Classification Search
CPC ... H04W 72/21; H04W 72/23; H04W 72/569; H04W 74/0833; H04W 72/0446;
          (Continued)

(56) References Cited

U.S. PATENT DOCUMENTS

2010/0074230 A1*   3/2010  Ishii ...................... H04W 72/20
                                                            370/336
2013/0028223 A1*   1/2013  Kim ................... H04W 56/0045
                                                            370/329
          (Continued)

FOREIGN PATENT DOCUMENTS

CN          105721133 A      6/2016
CN          109314985 A      2/2019
          (Continued)

OTHER PUBLICATIONS

AT&T "Remaining details on carrier aggregation" 3GPP TSG RAN WG1 Meeting 91, R1-1719651, Nov. 17, 2017, 3 pgs.
          (Continued)

*Primary Examiner* — Kan Yuen
(74) *Attorney, Agent, or Firm* — Price Heneveld LLP

(57)          ABSTRACT

Embodiments of the present disclosure provide an uplink transmission method, an uplink transmission indication method, and a device. The method includes: determining a first uplink grant, where the terminal does not generate a MAC PDU for the first uplink grant when satisfying a predetermined condition; and determining an uplink transmission behavior of the terminal based on a PUSCH corresponding to the first uplink grant and first uplink control information.

15 Claims, 3 Drawing Sheets

Start

Determine a first uplink grant, where a MAC PDU is not generated for the first uplink grant when a predetermined condition is satisfied

201

Determine an uplink transmission behavior of the terminal based on a PUSCH corresponding to the first uplink grant and first uplink control information

202

End

(51) Int. Cl.

| | |
|---|---|
| *H04W 72/23* | (2023.01) |
| *H04W 72/566* | (2023.01) |
| *H04W 74/0833* | (2024.01) |

(58) Field of Classification Search

CPC ........... H04W 72/566; H04W 72/1268; H04W 72/56; H04L 1/1812; H04L 1/0026; H04L 1/0027; H04L 1/1671; H04L 5/0044; H04L 5/0094; H04L 1/1854; H04L 1/0693; H04L 5/0053

See application file for complete search history.

(56) References Cited

U.S. PATENT DOCUMENTS

| | | | | |
|---|---|---|---|---|
| 2013/0329652 A1* | 12/2013 | Pani | .................... | H04W 72/121 370/329 |
| 2017/0207843 A1* | 7/2017 | Jung | .................. | H04W 74/006 |
| 2019/0052414 A1* | 2/2019 | Babaei | ................. | H04W 72/21 |
| 2019/0174524 A1 | 6/2019 | Yoshimura et al. | | |
| 2019/0200381 A1 | 6/2019 | Wu | | |
| 2019/0230667 A1 | 7/2019 | Loehr et al. | | |
| 2019/0274149 A1* | 9/2019 | Yoshimura | ............ | H04W 72/23 |
| 2020/0274654 A1* | 8/2020 | Loehr | ................... | H04W 72/23 |
| 2020/0322949 A1* | 10/2020 | Akkarakaran | ........ | H04L 5/0094 |
| 2020/0389847 A1* | 12/2020 | Deng | ............... | H04W 52/0219 |
| 2020/0404691 A1* | 12/2020 | Wu | ....................... | H04W 76/15 |
| 2022/0078768 A1* | 3/2022 | El Hamss | ............. | H04L 5/0055 |
| 2022/0159667 A1* | 5/2022 | Zhang | ............... | H04W 72/0453 |
| 2022/0369347 A1* | 11/2022 | Gao | ...................... | H04L 1/1854 |

FOREIGN PATENT DOCUMENTS

| | | |
|---|---|---|
| CN | 109479315 A | 3/2019 |
| EP | 3226639 A1 | 10/2017 |
| KR | 20190073346 A | 6/2019 |
| WO | 2019033071 A1 | 2/2019 |

OTHER PUBLICATIONS

Samsung "Corrections on UCI Multiplexing in PUSCH" 3GPP TSG RAN WG1 #92, R1-1801980, Feb. 14, 2018, 6 pgs.

International Application No. PCT/CN2020/124614 International Search Report and Written Opinion with Partial English Machine Translation mailed Jan. 19, 2021, 9 pgs.

Extended European search report for corresponding EP patent application 20881710.6, dated Feb. 14, 2023, 14 pgs.

Examination Report for corresponding India application 202217030365 issued Sep. 19, 2022, 5 pgs.

Ericsson, "HARQ and scheduling enhancements for NR-U", 3GPP TSG-RAN WG1 Meeting #98 Bis, R1-1910949, Chongqing, China, Oct. 14-Oct. 21, 2019.

First Chinese Office Action for Chinese Patent Application No. 202310435568.5 mailed Jul. 26, 2025, 10 pages.

\* cited by examiner

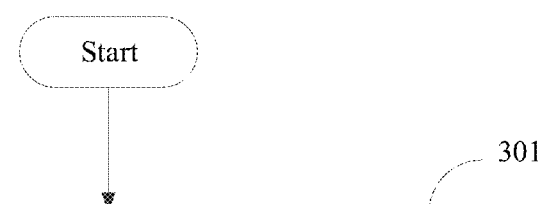

Start

301

Send a first indication, where the first indication indicates that sending time of a PUSCH corresponding to a first uplink grant of a terminal is different from sending time of first uplink control information; or the first indication indicates first time and second time, where the first time is sending time of a PUSCH corresponding to a first uplink grant, the second time is sending time of first uplink control information, the first time and the second time are different, and a MAC PDU is not generated for the first uplink grant when a predetermined condition is satisfied

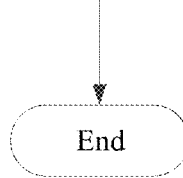

End

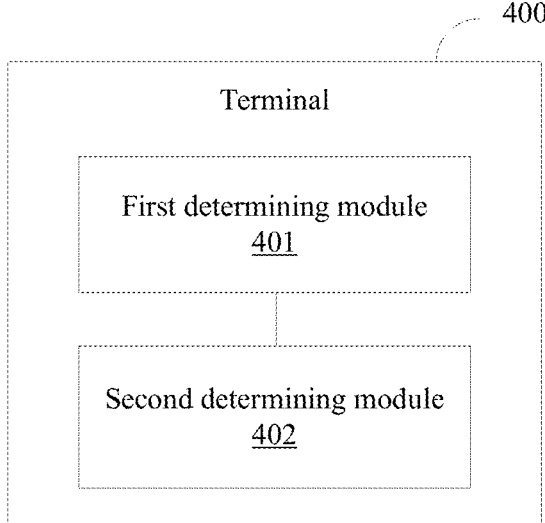

Terminal

First determining module
401

Second determining module
402

UPLINK TRANSMISSION METHOD, UPLINK TRANSMISSION INDICATION METHOD, AND DEVICE

CROSS-REFERENCE TO RELATED APPLICATIONS

The present disclosure is a continuation of International Application No. PCT/CN2020/124614, filed on Oct. 29, 2020, which claims priority to Chinese Patent Application No. 201911039529.3 filed in China on Oct. 29, 2019, which is incorporated herein by reference in its entirety.

TECHNICAL FIELD

Embodiments of the present disclosure relate to the field of communications technologies, and in particular, to an uplink transmission method, an uplink transmission indication method, and a device.

BACKGROUND

Uplink control information (Uplink Control Information, UCI) includes channel state information (Channel state Information, CSI) and hybrid automatic repeat request acknowledgement (Hybrid automatic repeat request acknowledgement, HARQ-ACK). The CSI generally includes a channel quality indicator (Channel Quality Indicator, CQI), a precoding matrix indicator (Precoding Matrix Indicator, PMI), and a rank indicator (Rank Indicator, RI). HARQ-ACK feedback information generally includes an acknowledgement (Acknowledgement, ACK) and a negative acknowledgement (Negative Acknowledgement, NACK). UCI information may be transmitted on a physical uplink control channel (Physical Uplink Control Channel, PUCCH), or may be transmitted on a physical uplink shared channel (Physical Uplink Shared Channel, PUSCH).

When UCI of UE needs to be sent through PUSCH multiplexing, it is possible that the UCI information cannot be sent because the UE does not send uplink data.

SUMMARY

Embodiments of the present disclosure are to provide an uplink transmission method, an uplink transmission indication method, and a device.

According to a first aspect of the present disclosure, an uplink transmission method, applied to a terminal, is provided, which includes:

determining a first uplink grant, where the terminal does not generate a media access control protocol data unit (MAC PDU) for the first uplink grant when satisfying a predetermined condition; and determining an uplink transmission behavior of the terminal based on a PUSCH corresponding to the first uplink grant and first uplink control information.

According to a second aspect of the present disclosure, an uplink transmission indication method, applied to a network device, is further provided, which includes:

sending a first indication, where the first indication indicates that sending time of a PUSCH corresponding to a first uplink grant of a terminal is different from sending time of first uplink control information; or the first indication indicates first time and second time, where the first time is sending time of a PUSCH corresponding to a first uplink grant, the second time is sending time of first uplink control information, the first time and the second time are different, and the terminal does not generate a MAC PDU for the first uplink grant when satisfying a predetermined condition.

According to a third aspect of the present disclosure, a terminal is provided, which includes:

a first determining module, configured to determine a first uplink grant, where the terminal does not generate a MAC PDU for the first uplink grant when satisfying a predetermined condition; and a second determining module, configured to determine an uplink transmission behavior of the terminal based on a PUSCH corresponding to the first uplink grant and first uplink control information.

According to a fourth aspect of the present disclosure, a network device is provided, which includes:

a sending module, configured to send a first indication, where the first indication indicates that sending time of a PUSCH corresponding to a first uplink grant of a terminal is different from sending time of first uplink control information; or the first indication indicates first time and second time, where the first time is sending time of a PUSCH corresponding to a first uplink grant, the second time is sending time of first uplink control information, the first time and the second time are different, and the terminal does not generate a MAC PDU for the first uplink grant when satisfying a predetermined condition.

According to a fifth aspect of the present disclosure, a communication device is provided, which includes a memory, a processor, and a program that is stored in the memory and that can run on the processor, where the program is executed by the processor, steps in the uplink transmission method described in the first aspect are implemented, or steps in the uplink transmission method described in the second aspect are implemented.

According to a sixth aspect of the present disclosure, a computer-readable storage medium is provided, where the computer-readable storage medium stores a computer program, and when the computer program is executed by a processor, steps in the uplink transmission method described in the first aspect are implemented, or steps in the uplink transmission method described in the second aspect are implemented.

BRIEF DESCRIPTION OF DRAWINGS

With reference to detailed descriptions in implementations in the following descriptions, various other advantages and benefits become clear to a person of ordinary skills in the art. The accompanying drawings are merely used to show the implementations, and are not considered as limitations to the present disclosure. In addition, in the entire accompanying drawings, same reference numerals are used to indicate the same component. In the accompanying drawings:

FIG. 3 is a flowchart of an uplink transmission indication method according to an embodiment of the present disclosure;

FIG. 4 is a schematic diagram of a terminal according to an embodiment of the present disclosure;

DESCRIPTION OF EMBODIMENTS

Figures 1, 2:
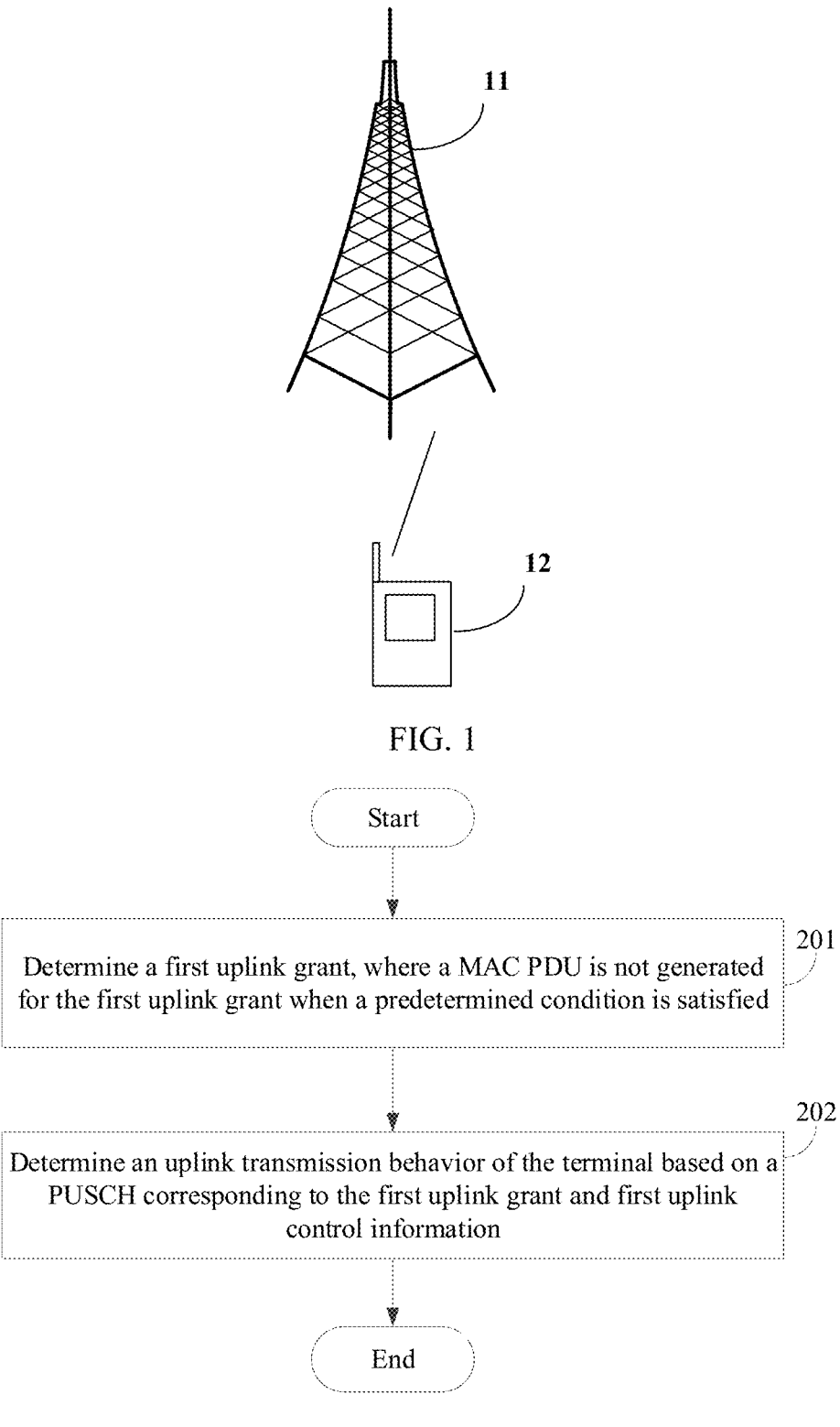
FIG. 1 is a schematic architectural diagram of a wireless communications system according to an embodiment of the present disclosure.
FIG. 2 is a flowchart of an uplink transmission method according to an embodiment of the present disclosure.

To better understand the embodiments of the present disclosure, the following describes the following technical points: uplink transmission ignoring:

For an uplink power saving requirement, in a fourth generation mobile communications technology (fourth generation, 4G) and a fifth generation mobile communications technology (fifth generation, 5G) system, a terminal (for example, user equipment (User Equipment, UE)) does not generate a corresponding medium access control protocol data unit (Medium Access Control Protocol Data Unit, MAC PDU) when no data is sent. That the UE does not need to generate the MAC PDU needs to meet all the following conditions at the same time:

A MAC entity is configured with an uplink ignore function, and an uplink grant used is scheduled by using a cell radio network temporary identity (Cell Radio Network Temporary Identity, C-RNTI). Alternatively, the used uplink grant is a configured uplink grant (Configured Grant, CG).

No channel state information (Channel State Information, CSI) is not periodically reported on a physical uplink shared channel (Physical Uplink Shared Channel, PUSCH).

There is no corresponding MAC service data unit (Service Data Unit, SDU) in the MAC PDU.

The MAC PDU includes only a buffer status report (Buffer Status Report, BSR), and no logical channel group has data. Alternatively, the MAC PDU includes only a padding BSR (padding BSR).

The following clearly describes the technical solutions in the embodiments of the present disclosure with reference to the accompanying drawings in the embodiments of the present disclosure. Apparently, the described embodiments are some rather than all of the embodiments of the present disclosure. Based on the embodiments of the present disclosure, all other embodiments obtained by a person of ordinary skill in the art without creative efforts shall fall within the protection scope of the present disclosure.

The term "include" and any modification thereof in the specification and claims of this application are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/ or" is used in the specification and claims to indicate at least one of connected objects, for example, A and/or B indicates three cases: only A exists, only B exists, or both A and B exist.

In the embodiments of the present disclosure, words such as "exemplary" or "for example" are used to indicate an example, an instance, or descriptions. Any embodiment or design scheme described as "exemplary" or "an example" in the embodiments of the present disclosure should not be construed as being preferable or advantageous than other embodiments or design schemes. Specifically, the words such as "exemplary" or "for example" are used to present related concepts in a specific manner.

The technology described in the present disclosure is not limited to a Long Term Evolution (Long Time Evolution, LTE) system or an LTE-advanced (LTE-Advanced, LTE-A) system, and may also be used in various wireless communications systems, for example, Code Division Multiple Access (Code Division Multiple Access, CDMA), Time Division Multiple Access (Time Division Multiple Access, TDMA), Frequency Division Multiple Access (Frequency Division Multiple Access, FDMA), Orthogonal Frequency Division Multiple Access (Orthogonal Frequency Division Multiple Access, OFDMA), Single-carrier Frequency-Division Multiple Access (Single-carrier Frequency-Division Multiple Access, SC-FDMA), and another system.

The terms "system" and "network" are often exchanged in use. A CDMA system may implement a radio technology such as CDMA2000 or universal terrestrial radio access (Universal Terrestrial Radio Access, UTRA). UTRA includes wideband CDMA (Wideband Code Division Multiple Access, WCDMA) and another CDMA variation. A TDMA system may implement a radio technology such as Global System for Mobile Communication (Global System for Mobile Communication, GSM). An OFDMA system may implement a radio technology such as Ultra Mobile Broadband (Ultra Mobile Broadband, UMB), evolved UTRA (Evolution-U IRA, E-UTRA), IEEE 802.11 (Wi-Fi), IEEE 802.16 (WiMAX), IEEE 802.20, or Flash-OFDM. U IRA and E-U IRA are parts of a universal mobile telecommunications system (Universal Mobile Telecommunications System, UTMS). LTE and advanced LTE (for example, LTE-A) are new UMTS versions that use E-U IRA. UTRA, E-UTRA, UMTS, LTE, LTE-A, and GSM are described in a document of an organization named "3rd Generation Partnership Project" (3rd Generation Partnership Project, 3GPP). CDMA2000 and UMB are described in a document of an origination named "3rd Generation Partnership Project 2" (3GPP2). The technology described in the present disclosure may also be used in the foregoing system and radio technology, and may also be used in another system and radio technology.

The embodiments of the present disclosure are described below with reference to the accompanying drawings. An uplink transmission method, an uplink transmission indication method, and a device provided in the embodiments of the present disclosure may be applied to a wireless communications system. FIG. 1 is a schematic architectural diagram of a wireless communications system according to an embodiment of the present disclosure. As shown in FIG. 1, the wireless communications system may include a network device 11 and a terminal 12. The terminal 12 may be denoted as UE 12, and the terminal 12 may communicate (transmit signaling or transmit data) with the network device 11. In actual application, a connection between the foregoing devices may be a wireless connection. To conveniently and intuitively represent a connection relationship between the devices, a solid line is used for illustration in FIG. 1.

The network device 11 provided in this embodiment of the present disclosure may be a base station, and the base station may be a generally used base station, or may be an evolved node base station (evolved node base station, eNB), or may be a device such as a network device (for example, a next generation node base station (next generation node base station, gNB) or a transmission and reception point (transmission and reception point, TRP)) in a 5G system.

The user equipment 12 provided in this embodiment of the present disclosure may be a mobile phone, a tablet computer, a notebook computer, an ultra-mobile personal computer (Ultra-Mobile Personal Computer, UMPC), a netbook, a personal digital assistant (Personal Digital Assistant, PDA), a mobile Internet device (Mobile Internet Device, MID), a wearable device (Wearable Device), a vehicle-mounted device, or the like.

As shown in FIG. 2, an embodiment of the present disclosure provides an uplink transmission method. The method is performed by a terminal, and the method includes step 201 and step 202.

Step 201: Determine a first uplink grant, where the terminal does not generate a MAC PDU for the first uplink grant when satisfying a predetermined condition.

For example, that the terminal does not generate a MAC PDU for the first uplink grant when satisfying a predetermined condition may be configured by a network side, or may be agreed upon in a protocol.

The predetermined condition may be a condition that UE needs to satisfy when the UE does not generate the MAC PDU, and is not described herein.

Step 202: Determine an uplink transmission behavior of the terminal based on a PUSCH corresponding to the first uplink grant and first uplink control information.

For example, before sending the first uplink control information by using the PUSCH corresponding to the first uplink grant, the terminal determines the uplink transmission behavior of the terminal based on the PUSCH corresponding to the first uplink grant and the first uplink control information.

In this embodiment of the present disclosure, optionally, the first uplink control information may include one or more of the following: (1) HARQ feedback information; (2) Periodic CSI report; (3) SR; (4) Physical random access channel (Physical Random Access Channel, PRACH) information.

Optionally, the HARQ feedback information includes one or more of the following:

(1) First HARQ feedback information, where a priority of the first HARQ feedback information is a high priority or a low priority, and the first HARQ feedback information is used to feed back a sending status of data of a high priority or data of a low priority.

For example, the HARQ feedback information includes a HARQ feedback corresponding to sending of the data of a high priority, or the HARQ feedback information includes a HARQ feedback corresponding to sending of the data of a low priority.

(2) Second HARQ feedback information (equivalent to HARQ feedback information on different cells), where a cell corresponding to the second HARQ feedback information is different from a cell corresponding to the PUSCH corresponding to the first uplink grant.

For example, HARQ feedback information of an SCell is sent by using a PUSCH channel of the PCell, or HARQ feedback information of an SCell-1 is sent by using a PUSCH channel of the SCell-2.

(3) Third HARQ feedback information (equivalent to HARQ feedback information on same cells), where a cell corresponding to the third HARQ feedback information is the same as a cell corresponding to the PUSCH corresponding to the first uplink grant.

For example, HARQ feedback information of an SCell-1 is sent by using a PUSCH channel of the SCell-1, or HARQ feedback information of a PCell is sent by using a PUSCH channel of the PCell.

Optionally, the periodic CSI report includes one or more of the following:

(1) A first periodic CSI report, where a priority of the first periodic CSI report is a high priority or a low priority, and the first periodic CSI report includes a CSI reporting amount of a high priority or a low priority.

For example, a periodic CSI report of a high priority may be a periodic CSI report of a PCell or a periodic CSI report used to measure neighboring cell interference.

(2) A second periodic CSI report (equivalent to periodic CSI reports on different cells), where a cell corresponding to the second periodic CSI report is different from a cell corresponding to the PUSCH corresponding to the first uplink grant.

For example, a periodic CSI report of an SCell is sent by using a PUSCH channel of a PCell, or a periodic CSI report of an SCell-1 is sent by using a PUSCH channel of the SCell-2.

(3) A third periodic CSI report (equivalent to periodic CSI reports on same cells), where a cell corresponding to the third periodic CSI report is the same as a cell corresponding to the PUSCH corresponding to the first uplink grant.

For example, a periodic CSI report of an SCell-1 is sent by using a PUSCH channel of an SCell-1, or a periodic CSI report of a PCell is sent by using a PUSCH channel of the PCell.

Optionally, the SR includes one or more of the following:

(1) A first SR, where a priority of the first SR is a high priority or a low priority, and the first SR is an SR triggered by a condition of a high priority or a condition of a low priority.

For example, the SR of a high priority may be triggered by logical channel data of a high priority, or the SR of a high priority is triggered by beam failure reporting, or the SR of a high priority is triggered by an uplink listen-before-talk (Listen-Before-Talk, LBT) failure.

(2) A second SR (equivalent to an SR on different cells), where a cell corresponding to the second SR is different from a cell corresponding to the PUSCH corresponding to the first uplink grant.

For example, an SR of an SCell is sent by using a PUSCH channel of a PCell, or an SR of an SCell-1 is sent by using a PUSCH channel of an SCell-2.

(3) A third SR (equivalent to an SR on same cells), where a cell corresponding to the third SR is the same as a cell corresponding to the PUSCH corresponding to the first uplink grant.

For example, an SR of an SCell-1 is sent by using a PUSCH channel resource multiplexing (for example, a resource element (Resource Element, RE) that occupies some PUSCH resources) of the SCell-1, or an SR of a PCell is sent by using a PUSCH channel of the PCell.

Optionally, the PRACH information includes one or more of the following:

(1) First PRACH information, where a priority of the first PRACH information is a high priority or a low priority, and the first PRACH information is PRACH information triggered by a condition of a high priority or a condition of a low priority.

For example, the PRACH information of a high priority may be triggered by logical channel data of a high priority, or the PRACH information of a high priority is triggered by beam failure reporting, or the PRACH information of a high priority is triggered by an uplink LBT failure.

For example, the PRACH information of a low priority may be triggered by a logical channel of a low priority or data of a low priority.

(2) Second PRACH information (equivalent to PRACH information on different cells), where a cell corresponding to the second PRACH information is different from a cell corresponding to the PUSCH corresponding to the first uplink grant.

For example, PRACH information of an SCell is sent by using a PUSCH channel of a PCell, or PRACH information of an SCell-1 is sent by using a PUSCH channel of an SCell-2.

(3) Third PRACH information (equivalent to PRACH information on same cells), where a cell corresponding to the third PRACH information is the same as a cell corresponding to the PUSCH corresponding to the first uplink grant.

For example, PRACH information of an SCell-1 is sent by using a PUSCH channel resource multiplexing (for example, an RE that occupies some PUSCH resources) of the SCell-1, or PRACH information of a PCell is sent by using a PUSCH channel of the PCell.

It may be understood that the foregoing content included in the first uplink control information may be configured by a network side or agreed upon in a protocol. For example, it is configured by the network or agreed upon in the protocol that the first uplink control information includes HARQ feedback information of a high priority, HARQ feedback information on same cells, or HARQ feedback information on different cells.

Alternatively, it is configured by the network or agreed upon in the protocol that the first uplink control information includes a periodic CSI report of a high priority, a periodic CSI report of a same cell, or periodic CSI reports on different cells.

Alternatively, it is configured by the network or agreed upon in the protocol that the first uplink control information includes an SR of a high priority, an SR on same cells, or an SR on different cells.

Alternatively, it is configured by the network or agreed upon in the protocol that the first uplink control information includes PRACH information of a high priority, PRACH information of a low priority, PRACH information on same cells, or PRACH information on different cells.

In some implementations, before or after step 201, or before or after step 202, the method shown in FIG. 2 may further include: receiving a first indication, where the first indication indicates that sending time of the PUSCH corresponding to the first uplink grant is different from sending time of the first uplink control information; or the first indication indicates first time and second time, where the first time is sending time of the PUSCH corresponding to the first uplink grant, the second time is sending time of the first uplink control information, and the first time and the second time are different.

For example, the terminal may receive the first indication by using scheduling information (for example, downlink control information (Downlink Control Information, DCI)) or higher layer signaling (for example, radio resource control (Radio Resource Control, RRC) signaling).

For example, for specific uplink control information (for example, HARQ feedback information) on a secondary cell (Secondary Cell, SCell), scheduling and sending of a PUSCH channel of a primary cell (Primary Cell, PCell) of the UE are performed at different time as sending of specific uplink control information on the SCell. In this way, the specific uplink control information on the SCell is sent more flexibly, and a conflict between power consumption of the terminal and UCI sending is balanced.

In some implementations, in step 202, when the first uplink control information is sent on the PUSCH corresponding to the first uplink grant, the MAC PDU is generated, and the MAC PDU is multiplexed and sent together with the first uplink control information, where content of the MAC PDU may be a padding field.

Optionally, the HARQ feedback information included in the first uplink control information may be HARQ feedback information of a high priority; or the periodic CSI report included in the first uplink control information may be a periodic CSI report of a high priority; or the SR included in the first uplink control information may be an SR of a high priority; or the PRACH information included in the first uplink control information may be PRACH information of a high priority.

For example, when the specific uplink control information on the SCell is sent by using the PUSCH channel of the PCell, although no data is sent on a PUSCH channel of a PCell of the UE, the UE still generates a MAC PDU to send the PUSCH channel of the PCell. Content of the MAC PDU may be a padding field.

In this way, even if no data is sent on the PUSCH channel of the PCell, the UE generates the MAC PDU, so that specific uplink control information may be multiplexed and sent together with the MAC PDU, so that the terminal sends the UCI more flexibly, and a conflict between power consumption of the terminal and UCI sending is balanced.

In some implementations, in step 202, if no MAC PDU is generated on the PUSCH corresponding to the first uplink grant, dummy bits (dummy bits) are generated by using a physical layer of the terminal, and the first uplink control information is multiplexed and sent together with the dummy bits. For example, the dummy bit is generated by using the physical layer of the terminal based on a transport block size of the first uplink grant.

Optionally, the HARQ feedback information included in the first uplink control information may be HARQ feedback information of a high priority; or the periodic CSI report included in the first uplink control information may be a periodic CSI report of a high priority; or the SR included in the first uplink control information may be an SR of a high priority; or the PRACH information included in the first uplink control information may be PRACH information of a high priority.

For example, when the specific uplink control information on the SCell is sent by using the PUSCH channel of the PCell, and no data is sent on a PUSCH channel of a PCell of the UE, a MAC entity of the UE does not generate the MAC PDU to send the PUSCH channel of the PCell. However, the physical layer of the UE generates the dummy bit based on a transport block size (Transport Block Size, TBS) of the uplink grant. For example, if the TBS is 10 bytes (byte), data of 10 bytes whose bit (bit) values are all "0" or all "1" is generated.

In this way, no data is sent on the PUSCH channel of the PCell, and the UE does not generate the MAC PDU, to meet an uplink power saving requirement of the UE. However, to enable the terminal that sends UCI to generate the dummy bit, the specific uplink control information is multiplexed and sent together with the dummy bit, so that the terminal sends the UCI more flexibly, and a conflict between power consumption of the terminal and UCI sending is balanced.

In some implementations, in step 202, when no uplink data (for example, uplink MAC PDU) is sent on the PUSCH corresponding to the first uplink grant in a first slot, the first uplink control information is not multiplexed into the PUSCH corresponding to the first uplink grant in the first slot.

Further, the method may further include: after the first uplink control information is not multiplexed into the PUSCH corresponding to the first uplink grant, if uplink data is sent on the PUSCH corresponding to the first uplink grant in a second slot, sending the first uplink control information by using the PUSCH corresponding to the first uplink grant in the second slot.

In some implementations, in step 202, when no uplink data (for example, an uplink MAC PDU) is not sent on the PUSCH corresponding to the first uplink grant, the first uplink control information is not multiplexed into the PUSCH corresponding to the first uplink grant.

Further, the method may further include: after the first uplink control information is not multiplexed into the PUSCH corresponding to the first uplink grant, if uplink data is sent on a PUSCH corresponding to a second uplink grant in a second slot, sending the first uplink control information by using the PUSCH corresponding to the second uplink grant in the second slot, where the terminal does not generate a MAC PDU for the second uplink grant when satisfying a predetermined condition.

Optionally, the HARQ feedback information included in the first uplink control information may be HARQ feedback information of a high priority; or the periodic CSI report included in the first uplink control information may be a periodic CSI report of a high priority; or the SR included in the first uplink control information may be an SR of a high priority; or the PRACH information included in the first uplink control information may be PRACH information of a high priority.

For example, when the specific uplink control information on the SCell is sent by using the PUSCH channel of the PCell, and no data is sent on a PUSCH channel of a PCell of the UE, specific uplink control information on an SCell of the UE is not multiplexed or sent together with the PUSCH of the PCell. Further, in both a slot 4 (slot-4) and a slot 5 (slot-5) of the PCell of the UE, there is an uplink grant that can be used for PUSCH sending, a HARQ feedback of the SCell of the UE is triggered in a slot 0 (slot-0), and the UE finds that no uplink data can be sent in the slot-4. In this case, the HARQ feedback of the SCell of the UE is multiplexed or sent by using a PUSCH in the slot-4 of the PCell, and when uplink data is sent in the slot-5 of the PCell, the HARQ feedback of the SCell of the UE is multiplexed and sent by using a PUSCH in the slot-5 of the PCell.

In this way, no data is sent on the PUSCH channel of the PCell, and the UE does not generate the MAC PDU, to meet an uplink power saving requirement of the UE. However, to send UCI, the terminal may send the specific uplink control information by using the PUSCH channel of the PCell only when data is sent on the PUSCH channel of the PCell, so that the terminal sends the UCI more flexibly, and a conflict between power consumption of the terminal and UCI sending is balanced.

In some implementations, in step 202, if no MAC PDU is generated, the first uplink control information is not generated on the physical layer of the terminal, or the physical layer of the terminal discards the generated first uplink control information.

Optionally, the HARQ feedback information included in the first uplink control information may be HARQ feedback information of a low priority; or the periodic CSI report included in the first uplink control information may be a periodic CSI report of a low priority; or the SR included in the first uplink control information may be an SR of a low priority; or the PRACH information included in the first uplink control information may be PRACH information of a low priority.

For example, the HARQ feedback information of a low priority includes HARQ feedback information used to feed back a sending status of data of a low priority. The periodic CSI report of a low priority includes channel state information used to feed back a channel of a low priority (for example, an SCell of a low priority). The SR of a low priority includes an SR triggered by data of a low priority or a logical channel of a low priority. The PRACH of a low priority includes a PRACH triggered by data of a low priority or a logical channel of a low priority.

For example, when the specific uplink control information on the SCell is sent by using the PUSCH channel of the PCell, and no data is sent on a PUSCH channel of a PCell of the UE, a MAC entity of the UE does not generate the MAC PDU to send the PUSCH channel of the PCell. The physical layer of the UE does not generate corresponding specific uplink control information. Alternatively, if the physical layer of the UE generates specific uplink control information (for example, uplink control information generated before determining whether there is uplink data), the UE discards the uplink control information. In this way, no data is sent on the PUSCH channel of the PCell, and the UE does not generate the MAC PDU, to satisfy an uplink power saving requirement of the UE.

As shown in FIG. 3, an embodiment of the present disclosure further provides an uplink transmission indication method. The method is performed by a network device, and a specific step includes step 301.

Step 301: Send a first indication, where the first indication indicates that sending time of a PUSCH corresponding to a first uplink grant of a terminal is different from sending time of first uplink control information; or the first indication indicates first time and second time, where the first time is sending time of a PUSCH corresponding to a first uplink grant, the second time is sending time of first uplink control information, the first time and the second time are different, and the terminal does not generate a MAC PDU for the first uplink grant when satisfying a predetermined condition.

The predetermined condition may be a condition that UE needs to satisfy when the UE does not generate the MAC PDU, and is not described herein.

For example, the network device may send the first indication by using scheduling information (for example, DCI or higher layer signaling (for example, RRC signaling)).

For example, for specific uplink control information (for example, HARQ feedback information) on an SCell, scheduling and sending of a PUSCH channel of a PCell of the UE are performed at different time as sending of specific uplink control information on the SCell.

In this embodiment of the present disclosure, optionally, the first uplink control information may include one or more of the following: (1) HARQ feedback information; (2) Periodic CSI report; (3) SR; (4) Physical random access channel (Physical Random Access Channel, PRACH) information.

Optionally, the HARQ feedback information includes one or more of the following:

(1) First HARQ feedback information, where a priority of the first HARQ feedback information is a high priority, and the first HARQ feedback information is used to feed back a sending status of data of a high priority.

For example, HARQ feedback information includes HARQ feedback corresponding to sending of the data of a high priority.

(2) Second HARQ feedback information (equivalent to HARQ feedback information on different cells), where a cell corresponding to the second HARQ feedback information is different from a cell corresponding to the PUSCH corresponding to the first uplink grant.

For example, HARQ feedback information of an SCell is sent by using a PUSCH channel of the PCell, or HARQ feedback information of an SCell-1 is sent by using a PUSCH channel of the SCell-2.

(3) Third HARQ feedback information (equivalent to HARQ feedback information on same cells), where a cell corresponding to the third HARQ feedback information is the same as a cell corresponding to the PUSCH corresponding to the first uplink grant.

For example, HARQ feedback information of an SCell-1 is sent by using a PUSCH channel of the SCell-1, or HARQ feedback information of a PCell is sent by using a PUSCH channel of the PCell.

Optionally, the periodic CSI report includes one or more of the following:

(1) A first periodic CSI report, where a priority of the first periodic CSI report is a high priority, and the first periodic CSI report includes a CSI reporting amount of a high priority.

For example, a periodic CSI report of a high priority may be a periodic CSI report of a PCell or a periodic CSI report used to measure neighboring cell interference.

(2) A second periodic CSI report (equivalent to periodic CSI reports on different cells), where a cell corresponding to the second periodic CSI report is different from a cell corresponding to the PUSCH corresponding to the first uplink grant.

For example, a periodic CSI report of an SCell is sent by using a PUSCH channel of a PCell, or a periodic CSI report of an SCell-1 is sent by using a PUSCH channel of the SCell-2.

(3) A third periodic CSI report (equivalent to periodic CSI reports on same cells), where a cell corresponding to the third periodic CSI report is the same as a cell corresponding to the PUSCH corresponding to the first uplink grant.

For example, a periodic CSI report of an SCell-1 is sent by using a PUSCH channel of an SCell-1, or a periodic CSI report of a PCell is sent by using a PUSCH channel of the PCell.

Optionally, the SR includes one or more of the following:

(1) A first SR, where a priority of the first SR is a high priority, and the first SR is an SR triggered by a condition of a high priority.

For example, the SR of a high priority may be triggered by logical channel data of a high priority, or the SR of a high priority is triggered by beam failure reporting, or the SR of a high priority is triggered by an uplink listen-before-talk failure.

(2) A second SR (equivalent to an SR on different cells), where a cell corresponding to the second SR is different from a cell corresponding to the PUSCH corresponding to the first uplink grant.

For example, an SR of an SCell is sent by using a PUSCH channel of a PCell, or an SR of an SCell-1 is sent by using a PUSCH channel of an SCell-2.

(3) A third SR (equivalent to an SR on same cells), where a cell corresponding to the third SR is the same as a cell corresponding to the PUSCH corresponding to the first uplink grant.

For example, an SR of an SCell-1 is sent by using a PUSCH channel resource multiplexing (for example, an RE that occupies some PUSCH resources) of the SCell-1, or an SR of a PCell is sent by using a PUSCH channel of the PCell.

Optionally, the PRACH information includes one or more of the following:

(1) First PRACH information, where a priority of the first PRACH information is a high priority, and the first PRACH information is PRACH information triggered by a condition of a high priority.

For example, the PRACH information of a high priority may be triggered by logical channel data of a high priority, or the PRACH information of a high priority is triggered by beam failure reporting, or the PRACH information of a high priority is triggered by an uplink LBT failure.

(2) Second PRACH information (equivalent to PRACH information on different cells), where a cell corresponding to the second PRACH information is different from a cell corresponding to the PUSCH corresponding to the first uplink grant.

For example, PRACH information of an SCell is sent by using a PUSCH channel of a PCell, or PRACH information of an SCell-1 is sent by using a PUSCH channel of an SCell-2.

(3) Third PRACH information (equivalent to PRACH information on same cells), where a cell corresponding to the third PRACH information is the same as a cell corresponding to the PUSCH corresponding to the first uplink grant.

For example, PRACH information of an SCell-1 is sent by using a PUSCH channel resource multiplexing (for example, an RE that occupies some PUSCH resources) of the SCell-1, or PRACH information of a PCell is sent by using a PUSCH channel of the PCell.

In the embodiments of the present disclosure, the terminal may more flexibly sends UCI, and a conflict between power consumption of the terminal and UCI sending is balanced.

As shown in FIG. 4, an embodiment of the present disclosure further provides a terminal. The terminal 400 includes:

a first determining module 401, configured to determine a first uplink grant, where the terminal does not generate a MAC PDU for the first uplink grant when satisfying a predetermined condition; and a second determining module 402, configured to determine an uplink transmission behavior of the terminal based on a PUSCH corresponding to the first uplink grant and first uplink control information.

In some implementations, that the terminal does not generate the MAC PDU for the first uplink grant is configured by a network side or agreed upon in a protocol.

In some implementations, the second determining module 402 is further configured to: when the first uplink control information is sent on the PUSCH corresponding to the first uplink grant, generate a MAC PDU, and multiplex the MAC PDU with the first uplink control information and send the MAC PDU and the first uplink control information.

In some implementations, the second determining module 402 is further configured to: if the terminal does not generate the MAC PDU for the first uplink grant, generate a dummy bit by using a physical layer of the terminal, and multiplex and send the first uplink control information and the dummy bit.

In some implementations, the second determining module 402 is further configured to: generate the dummy bit by using the physical layer of the terminal based on a transport block size of the first uplink grant.

In some implementations, the second determining module 402 is further configured to: when no uplink data (for example, an uplink MAC PDU) is sent on the PUSCH corresponding to the first uplink grant in a first slot, not multiplex the first uplink control information into the PUSCH corresponding to the first uplink grant in the first slot.

In some implementations, the second determining module 402 is further configured to: when uplink data (for example, an uplink MAC PDU) is sent on the PUSCH corresponding to the first uplink grant in a second slot, send the first uplink control information by using the PUSCH corresponding to the first uplink grant in the second slot.

In some implementations, the second determining module 402 is further configured to: when no uplink data (for example, an uplink MAC PDU) is sent on the PUSCH corresponding to the first uplink grant, not multiplex the first uplink control information into the PUSCH corresponding to the first uplink grant.

In some implementations, the second determining module 402 is further configured to: when uplink data (for example, an uplink MAC PDU) is sent on a PUSCH corresponding to a second uplink grant, send the first uplink control information by using the PUSCH corresponding to the second uplink grant, where the terminal does not generate a MAC PDU for the second uplink grant when satisfying a predetermined condition.

In some implementations, the second determining module 402 is further configured to: if no MAC PDU is generated, not generate the first uplink control information on a physical layer of the terminal, or discard, by a physical layer of the terminal, the generated first uplink control information.

In some implementations, the terminal shown in FIG. 4 further includes: a receiving module, configured to receive a first indication, where the first indication indicates that sending time of the PUSCH corresponding to the first uplink grant is different from sending time of the first uplink control information.

In this embodiment of the present disclosure, optionally, the first uplink control information may include one or more of the following: (1) HARQ feedback information; (2) Periodic CSI report; (3) SR; (4) PRACH information.

Optionally, the HARQ feedback information includes one or more of the following:

(1) First HARQ feedback information, where a priority of the first HARQ feedback information is a high priority or a low priority.

(2) Second HARQ feedback information (equivalent to HARQ feedback information on different cells), where a cell corresponding to the second HARQ feedback information is different from a cell corresponding to the PUSCH corresponding to the first uplink grant.

(3) Third HARQ feedback information (equivalent to HARQ feedback information on same cells), where a cell corresponding to the third HARQ feedback information is the same as a cell corresponding to the PUSCH corresponding to the first uplink grant.

Optionally, the periodic CSI report includes one or more of the following:

(1) A first periodic CSI report, where a priority of the first periodic CSI report is a high priority or a low priority.

(2) A second periodic CSI report (equivalent to periodic CSI reports on different cells), where a cell corresponding to the second periodic CSI report is different from a cell corresponding to the PUSCH corresponding to the first uplink grant.

(3) A third periodic CSI report (equivalent to periodic CSI reports on same cells), where a cell corresponding to the third periodic CSI report is the same as a cell corresponding to the PUSCH corresponding to the first uplink grant.

Optionally, the SR includes one or more of the following:

(1) A first SR, where a priority of the first SR is a high priority or a low priority.

(2) A second SR (equivalent to an SR on different cells), where a cell corresponding to the second SR is different from a cell corresponding to the PUSCH corresponding to the first uplink grant.

(3) A third SR (equivalent to an SR on same cells), where a cell corresponding to the third SR is the same as a cell corresponding to the PUSCH corresponding to the first uplink grant.

Optionally, the PRACH information includes one or more of the following:

(1) First PRACH information, where a priority of the first PRACH information is a high priority or a low priority.

(2) Second PRACH information (equivalent to PRACH information on different cells), where a cell corresponding to the second PRACH information is different from a cell corresponding to the PUSCH corresponding to the first uplink grant.

(3) Third PRACH information (equivalent to PRACH information on same cells), where a cell corresponding to the third PRACH information is the same as a cell corresponding to the PUSCH corresponding to the first uplink grant.

In the embodiments of the present disclosure, the terminal may more flexibly sends UCI, and a conflict between power consumption of the terminal and UCI sending is balanced.

The terminal provided in the embodiments of the present disclosure can implement processes implemented by the terminal in the method embodiment of FIG. 2. To avoid repetition, details are not described herein again.

Figure 5:
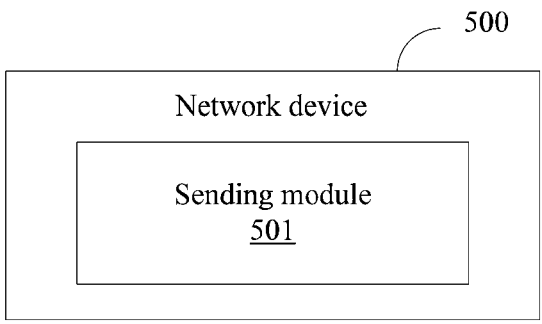
FIG. 5 is a schematic diagram of a network device according to an embodiment of the present disclosure.

As shown in FIG. 5, an embodiment of the present disclosure further provides a network device. The network device 500 includes:

a sending module 501, configured to send a first indication, where the first indication indicates that sending time of a PUSCH corresponding to a first uplink grant of a terminal is different from sending time of first uplink control information; or the first indication indicates first time and second time, where the first time is sending time of a PUSCH corresponding to a first uplink grant, and the second time is sending time of first uplink control information.

In addition, the first time is different from the second time, and the terminal does not generate a MAC PDU for the first uplink grant when satisfying a predetermined condition.

In some implementations, the sending module 501 is further configured to: send the first indication by using scheduling information or higher layer signaling.

In this embodiment of the present disclosure, optionally, the first uplink control information may include one or more of the following: (1) HARQ feedback information; (2) Periodic CSI report; (3) SR; (4) PRACH information.

Optionally, the HARQ feedback information includes one or more of the following:

(1) First HARQ feedback information, where a priority of the first HARQ feedback information is a high priority.

(2) Second HARQ feedback information (equivalent to HARQ feedback information on different cells), where a cell corresponding to the second HARQ feedback information is different from a cell corresponding to the PUSCH corresponding to the first uplink grant.

(3) Third HARQ feedback information (equivalent to HARQ feedback information on same cells), where a cell corresponding to the third HARQ feedback information is the same as a cell corresponding to the PUSCH corresponding to the first uplink grant.

Optionally, the periodic CSI report includes one or more of the following:

(1) A first periodic CSI report, where a priority of the first periodic CSI report is a high priority.

(2) A second periodic CSI report (equivalent to periodic CSI reports on different cells), where a cell corresponding to the second periodic CSI report is different from a cell corresponding to the PUSCH corresponding to the first uplink grant.

(3) A third periodic CSI report (equivalent to periodic CSI reports on same cells), where a cell corresponding to the third periodic CSI report is the same as a cell corresponding to the PUSCH corresponding to the first uplink grant.

Optionally, the SR includes one or more of the following:

(1) A first SR, where a priority of the first SR is a high priority.

(2) A second SR (equivalent to an SR on different cells), where a cell corresponding to the second SR is different from a cell corresponding to the PUSCH corresponding to the first uplink grant.

(3) A third SR (equivalent to an SR on same cells), where a cell corresponding to the third SR is the same as a cell corresponding to the PUSCH corresponding to the first uplink grant.

Optionally, the PRACH information includes one or more of the following:

(1) First PRACH information, where a priority of the first PRACH information is a high priority.

(2) Second PRACH information (equivalent to PRACH information on different cells), where a cell corresponding to the second PRACH information is different from a cell corresponding to the PUSCH corresponding to the first uplink grant.

(3) Third PRACH information (equivalent to PRACH information on same cells), where a cell corresponding to the third PRACH information is the same as a cell corresponding to the PUSCH corresponding to the first uplink grant.

The network device provided in the embodiments of the present disclosure can implement processes implemented by the terminal in the method embodiment of FIG. 3. To avoid repetition, details are not described herein again.

Figure 6:
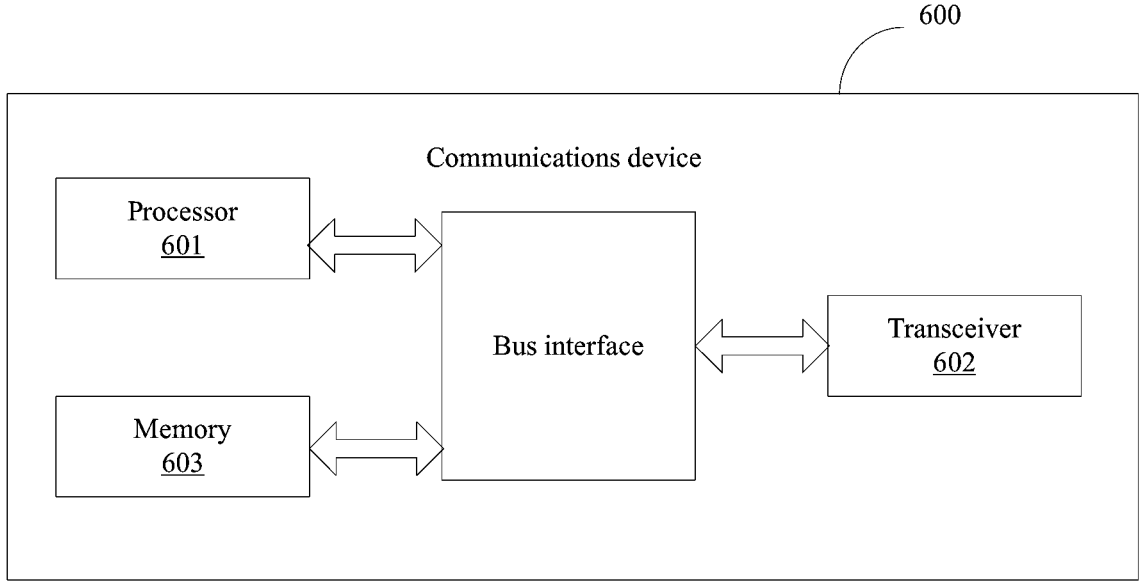
FIG. 6 is a schematic diagram of a communications device according to an embodiment of the present disclosure.

As shown in FIG. 6, FIG. 6 is a structural diagram of a communications device applied to an embodiment of the present disclosure. As shown in FIG. 6, the communications device 600 includes a processor 601, a transceiver 602, a memory 603, and a bus interface. The processor 601 may be responsible for managing a bus architecture and normal processing. The memory 603 may store data used when the processor 601 performs an operation.

In an embodiment of the present disclosure, the communications device 600 further includes a program that is stored in the memory 603 and that may run on the processor 601. When the program is executed by the processor 601, steps in the method shown in FIG. 2 or FIG. 3 are implemented.

In FIG. 6, a bus architecture may include any quantity of interconnected buses and bridges, and is linked by various circuits of one or more processors represented by the processor 601 and a memory represented by the memory 603. The bus architecture may further link various other circuits such as a peripheral device, a voltage regulator, and a power management circuit together. These are all well-known in the art, and therefore are not further described in this specification. The bus interface provides interfaces. The transceiver 602 may be multiple elements, in other words, includes a transmitter and a receiver, and provides a unit configured to communicate with various other apparatuses on a transmission medium.

The communication device provided in this embodiment of the present disclosure may execute the foregoing method embodiment shown in FIG. 2 or FIG. 3, and implementation principles and technical effects thereof are similar, and details are not described herein again in this embodiment.

The methods or algorithm steps described with reference to the present disclosure may be implemented in a hardware manner, or may be implemented in a manner in which the processor executes a software instruction. The software instruction may include a corresponding software module. The software module may be stored in a random access memory (Random Access Memory, RAM), a flash memory, a read-only memory (Read-Only Memory, ROM), an erasable programmable read-only memory (Erasable PROM, EPROM), an electrically erasable programmable read-only memory (Electrically EPROM, EEPROM), a register, a hard disk, a removable hard disk, a read-only optical disc, or any other form of storage medium familiar in the art. An exemplary storage medium is coupled to a processor, so that the processor can read information from the storage medium and can write information to the storage medium. Certainly, the storage medium may alternatively be an integral part of the processor. The processor and the storage medium may be located in an application specific integrated circuit (Application Specific Integrated Circuit, ASIC). In addition, the ASIC may be located in a core network interface device. Certainly, the processor and the storage medium may also exist as discrete components in the core network interface device.

A person skilled in the art may be aware that in one or more of the foregoing examples, functions described in the present disclosure may be implemented by hardware, software, firmware, or any combination thereof. When implemented by using software, these functions may be stored in a computer-readable medium or transmitted as one or more instructions or codes on the computer-readable medium. The computer-readable medium includes a computer storage medium and a communication medium, where the communication medium includes any medium that can transfer a computer program from one place to another. The storage medium may be any available medium accessible to a general-purpose or dedicated computer.

In the foregoing specific implementations, the objectives, technical solutions, and beneficial effects of the disclosure are further described in detail. It should be understood that the foregoing descriptions are merely specific implementations of the present disclosure, and are not intended to limit the protection scope of the present disclosure. Any modification, equivalent replacement, or improvement made based on the technical solutions of the present disclosure shall fall within the protection scope of the present disclosure.

A person skilled in the art should understand that the embodiments of the present disclosure may be provided as methods, systems, or computer program products. Therefore, the embodiments of the present disclosure may be embodiments in a form of a complete hardware embodiment, a complete software embodiment, or an embodiment incorporating software and hardware aspects. Furthermore, the embodiments of the present disclosure may be in a form of a computer program product implemented on one or more computer-usable storage mediums (including but not limited to a disk memory, a CD-ROM, an optical memory, and the like) including computer-usable program code.

The embodiments of the present disclosure is described with reference to a flowchart and/or block diagram of a method, a device (system), and a computer program product according to the embodiments of the present disclosure. It is to be understood that each process and/or block in the flowcharts and/or block diagrams, and a combination of processes and/or blocks in the flowcharts and/or block diagrams may be implemented by computer program instructions. These computer program instructions may be provided to a processor of a general-purpose computer, a dedicated computer, an embedded processor, or another programmable data processing device to produce a machine, so that instructions executed by a processor of a computer or another programmable data processing device produce an apparatus for implementing a function specified in one or more processes in the flowcharts and/or one or more blocks in the block diagrams.

These computer program instructions may also be stored in a computer-readable memory that can instruct the computer or another programmable data processing device to work in a specific manner, so that an instruction stored in the computer-readable memory generates a manufacturer including an instruction apparatus, and the instruction apparatus implements a function specified in one or more processes in the flowcharts and/or one or more blocks in the block diagrams.

These computer program instructions may also be loaded onto the computer or another programmable data processing device such that a series of operation steps are performed on the computer or another programmable device to produce computer-implemented processing, so that instructions executed on the computer or other programmable device provides steps for implementing the functions specified in one or more processes in the flowcharts and/or one or more blocks in the block diagrams.

Apparently, a person skilled in the art may make various modifications and variations to the embodiments of the present disclosure without departing from the spirit and scope of the present disclosure. In this way, if these modifications and variations of the embodiments of the present disclosure fall within the scope of the claims of the present disclosure and their equivalents, the present disclosure is also intended to include these modifications and variations.

The invention claimed is:

1. An uplink transmission method performed by a terminal, comprising:
  determining a first uplink grant; and
  determining an uplink transmission behavior of the terminal,
  the determining an uplink transmission behavior of the terminal, comprises:
  generating a media access control protocol data unit (MAC PDU) in response to that there is first uplink control information (UCI) to be multiplexed on a physical uplink shared channel (PUSCH) transmission corresponding to the first uplink grant, and multiplexing the MAC PDU with the first uplink control information and sending the MAC PDU and the first uplink control information, wherein content of the MAC PDU is only padding;
  wherein the first UCI comprises one or more of the following:
  hybrid automatic repeat request (HARQ) feedback information;
  a periodic channel state information (CSI) report; or
  a scheduling request (SR);

wherein the determining an uplink transmission behavior of the terminal comprises:
  in a case that the terminal does not generate the MAC PDU for the PUSCH corresponding to the first uplink grant, generating a dummy bit by using a physical layer of the terminal; and
  multiplexing the first uplink control information with the dummy bit, and sending the first uplink control information and the dummy bit,
  wherein the generating a dummy bit by using a physical layer of the terminal comprises:
  generating the dummy bit by using the physical layer of the terminal based on a transport block size of the first uplink grant.

2. The method according to claim 1, wherein that the terminal does not generate the MAC PDU for the first uplink grant is configured by using a network side or agreed upon in a protocol.

3. The method according to claim 1, wherein the determining an uplink transmission behavior of the terminal, further comprises:
  generating the MAC PDU when a predetermined condition is not satisfied, wherein the predetermined condition comprises at least one of the followings:
  a MAC entity is configured with an uplink ignore function, and an uplink grant used is scheduled by using a cell radio network temporary identity (C-RNTI), or the used uplink grant is a configured uplink grant (CG);
  no channel state information (CSI) is not periodically reported on a PUSCH;
  no corresponding MAC service data unit (SDU) is presented in the MAC PDU; or
  the MAC PDU includes only a buffer status report (BSR), and no logical channel group has data, or the MAC PDU includes only a padding BSR.

4. The method according to claim 1, wherein the determining an uplink transmission behavior of the terminal further comprises:
  when no uplink data is sent on the PUSCH corresponding to the first uplink grant, skipping multiplexing the first uplink control information to the PUSCH corresponding to the first uplink grant,
  wherein, after the skipping multiplexing the first uplink control information to the PUSCH corresponding to the first uplink grant, further comprising:
  when uplink data is sent on a PUSCH corresponding to a second uplink grant, sending the first uplink control information by using the PUSCH corresponding to the second uplink grant, wherein the terminal does not generate a MAC PDU for the second uplink grant when satisfying a predetermined condition.

5. The method according to claim 1, wherein the determining an uplink transmission behavior of the terminal further comprises:
  in a case that no MAC PDU is generated, skipping generating the first uplink control information on a physical layer of the terminal, or discarding, by a physical layer of the terminal, the generated first uplink control information.

6. The method according to claim 1, further comprising:
  receiving a first indication, wherein the first indication indicates that sending time of the PUSCH corresponding to the first uplink grant is different from sending time of the first uplink control information; or the first indication indicates first time and second time, wherein the first time is sending time of the PUSCH corresponding to the first uplink grant, the second time is sending time of the first uplink control information, and the first time and the second time are different.

7. The method according to claim 1, wherein the first uplink control information further comprises:

physical random access channel (PRACH) information.

8. The method according to claim 7, wherein the HARQ feedback information comprises one or more of the following:

first HARQ feedback information, wherein a priority of the first HARQ feedback information is a high priority or a low priority;

second HARQ feedback information, wherein a cell corresponding to the second HARQ feedback information is different from a cell corresponding to the PUSCH corresponding to the first uplink grant; and third HARQ feedback information, wherein a cell corresponding to the third HARQ feedback information is the same as the cell corresponding to the PUSCH corresponding to the first uplink grant, wherein the periodic CSI report comprises one or more of the following:

a first periodic CSI report, wherein a priority of the first periodic CSI report is a high priority or a low priority;

a second periodic CSI report, wherein a cell corresponding to the second periodic CSI report is different from a cell corresponding to the PUSCH corresponding to the first uplink grant; and a third periodic CSI report, wherein a cell corresponding to the third periodic CSI report is the same as the cell corresponding to the PUSCH corresponding to the first uplink grant, wherein the SR comprises one or more of the following:

a first SR, wherein a priority of the first SR is a high priority or a low priority;

a second SR, wherein a cell corresponding to the second SR is different from a cell corresponding to the PUSCH corresponding to the first uplink grant; and a third SR, wherein a cell corresponding to the third SR is the same as the cell corresponding to the PUSCH corresponding to the first uplink grant, wherein the PRACH information comprises one or more of the following:

first PRACH information, wherein a priority of the first PRACH information is a high priority or a low priority;

second PRACH information, wherein a cell corresponding to the second PRACH information is different from a cell corresponding to the PUSCH corresponding to the first uplink grant; and third PRACH information, wherein a cell corresponding to the third PRACH information is the same as the cell corresponding to the PUSCH corresponding to the first uplink grant.

9. A terminal, comprising: a memory, a processor, and a program that is stored in the memory and that can run on the processor, wherein when the program is executed by the processor, the program implements:

determining a first uplink grant; and determining an uplink transmission behavior of the terminal, the determining an uplink transmission behavior of the terminal, comprises:

generating a media access control protocol data unit (MAC PDU) in response to that there is first uplink control information (UCI) to be multiplexed on a physical uplink shared channel (PUSCH) transmission corresponding to the first uplink grant, and multiplexing the MAC PDU with the first uplink control information and sending the MAC PDU and the first uplink control information, wherein content of the MAC PDU is only padding;

wherein the first UCI comprises one or more of the following:

hybrid automatic repeat request (HARQ) feedback information;

a periodic channel state information (CSI) report; or a scheduling request (SR);

wherein the determining an uplink transmission behavior of the terminal comprises:

in a case that the terminal does not generate the MAC PDU for the PUSCH corresponding to the first uplink grant, generating a dummy bit by using a physical layer of the terminal; and multiplexing the first uplink control information with the dummy bit, and sending the first uplink control information and the dummy bit, wherein the generating a dummy bit by using a physical layer of the terminal comprises:

generating the dummy bit by using the physical layer of the terminal based on a transport block size of the first uplink grant.

10. The terminal according to claim 9, wherein that the terminal does not generate the MAC PDU for the first uplink grant is configured by using a network side or agreed upon in a protocol.

11. The terminal according to claim 9, wherein the determining an uplink transmission behavior of the terminal, further comprises:

generating the MAC PDU when a predetermined condition is not satisfied, wherein the predetermined condition comprises at least one of the followings:

a MAC entity is configured with an uplink ignore function, and an uplink grant used is scheduled by using a cell radio network temporary identity (C-RNTI), or the used uplink grant is a configured uplink grant (CG);

no channel state information (CSI) is not periodically reported on a PUSCH;

no corresponding MAC service data unit (SDU) is presented in the MAC PDU; or the MAC PDU includes only a buffer status report (BSR), and no logical channel group has data, or the MAC PDU includes only a padding BSR.

12. The terminal according to claim 9, wherein the determining an uplink transmission behavior of the terminal further comprises:

when no uplink data is sent on the PUSCH corresponding to the first uplink grant, skipping multiplexing the first uplink control information to the PUSCH corresponding to the first uplink grant, wherein, after the skipping multiplexing the first uplink control information to the PUSCH corresponding to the first uplink grant, further comprising:

when uplink data is sent on a PUSCH corresponding to a second uplink grant, sending the first uplink control information by using the PUSCH corresponding to the second uplink grant, wherein the terminal does not generate a MAC PDU for the second uplink grant when satisfying a predetermined condition.

13. The terminal according to claim 9, wherein the determining an uplink transmission behavior of the terminal further comprises:

in a case that no MAC PDU is generated, skipping generating the first uplink control information on a physical layer of the terminal, or discarding, by a physical layer of the terminal, the generated first uplink control information.

14. The terminal according to claim 9, further comprising:

receiving a first indication, wherein the first indication indicates that sending time of the PUSCH corresponding to the first uplink grant is different from sending time of the first uplink control information; or the first indication indicates first time and second time, wherein the first time is sending time of the PUSCH corresponding to the first uplink grant, the second time is sending time of the first uplink control information, and the first time and the second time are different.

15. The terminal according to claim 9, wherein the first uplink control information further comprises:

physical random access channel (PRACH) information.

\*   \*   \*   \*   \*